US008316377B2

(12) United States Patent
Riley

(10) Patent No.: US 8,316,377 B2
(45) Date of Patent: Nov. 20, 2012

(54) SHARING LEGACY DEVICES IN A MULTI-HOST ENVIRONMENT

(75) Inventor: Dwight D. Riley, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1179 days.

(21) Appl. No.: 11/851,306

(22) Filed: Sep. 6, 2007

(65) Prior Publication Data
US 2009/0070775 A1 Mar. 12, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. ............. 719/311; 710/312; 710/306; 718/1

(58) Field of Classification Search .................. 719/311; 718/1; 710/312, 306
See application file for complete search history.

(56) References Cited

U.S. PATENT DOCUMENTS

| | | | | |
|---|---|---|---|---|
| 6,618,777 | B1 * | 9/2003 | Greenfield | 710/120 |
| 6,981,174 | B1 * | 12/2005 | Hanning | 714/5.1 |
| 7,058,738 | B2 * | 6/2006 | Stufflebeam, Jr. | 710/104 |
| 7,251,704 | B2 * | 7/2007 | Solomon et al. | 710/316 |
| 7,567,556 | B2 * | 7/2009 | Beshai | 370/360 |
| 7,613,864 | B2 * | 11/2009 | Torudbakken et al. | 710/312 |
| 7,680,096 | B2 * | 3/2010 | Jenkins et al. | 370/351 |
| 2004/0030766 | A1 * | 2/2004 | Witkowski | 709/223 |
| 2004/0172494 | A1 * | 9/2004 | Pettey et al. | 710/305 |
| 2005/0201749 | A1 * | 9/2005 | Wang et al. | 398/12 |
| 2005/0238035 | A1 | 10/2005 | Riley | |
| 2006/0146835 | A1 * | 7/2006 | Homchaudhuri et al. | 370/395.53 |
| 2006/0259731 | A1 * | 11/2006 | Oshins et al. | 711/173 |
| 2007/0136550 | A1 | 6/2007 | Garney et al. | |

OTHER PUBLICATIONS

International Searching Authority, Notification of Transmittal of the International Search Report and Written Opinion of the International Searching Authority, Apr. 7, 2009.

* cited by examiner

*Primary Examiner* — Diem Cao

(57) ABSTRACT

Systems and methods of sharing legacy devices in a multi-host environment are disclosed. An exemplary method for sharing legacy devices in a multi-host environment includes receiving device information from a legacy device, the device information identifying a target within a virtual machine. The method also includes encapsulating the device information into a corresponding bus transaction for a network switch fabric. The method also includes routing the bus transaction over the network switch fabric in the virtual machine to a host within the virtual machine.

22 Claims, 5 Drawing Sheets

SHARING LEGACY DEVICES IN A MULTI-HOST ENVIRONMENT

BACKGROUND

Traditional computer systems (e.g., desktop personal computers and server computers) used a single Industry Standard Architecture (ISA) interconnect to connect devices (e.g., keyboard and mouse). The Peripheral Components Interconnect (PCI) interconnect was developed to connect other devices (e.g., video) via an adapter card to the processor. A Host/PCI interconnect bridge typically connects the host interconnect and the PCI interconnect. All of these interconnects were intended for a direct connection between the device and the CPU and were not intended to be shared.

Today disaggregated server architecture is a thing of the super computer. However, virtualization is driving toward more resource sharing and pooling into the mainstream/volume servers. It is expected that mainstream providers will be introducing server disaggregation architectures in the coming years. Efforts around standardization can be seen from within industry standard bodies such as the PCI-SIG's IOV workgroup.

The PCI interconnect was conceived as a Local IO interconnect, and as such it was created to link devices within a single host (in the box architecture). The cost and speeds of PCI make it an attractive solution for disaggregating the system architecture. However, PCI has a number of challenges to overcome including its rooted architecture, ordering rules and legacy programming model as a result a number of unsuccessful attempts to extended PCI. For example, disaggregated volume systems do not include interconnect connectors, such as a PCI connector, because of a perceived difficulty in extending the PCI interconnect across the backplane.

DETAILED DESCRIPTION

Figure 1:
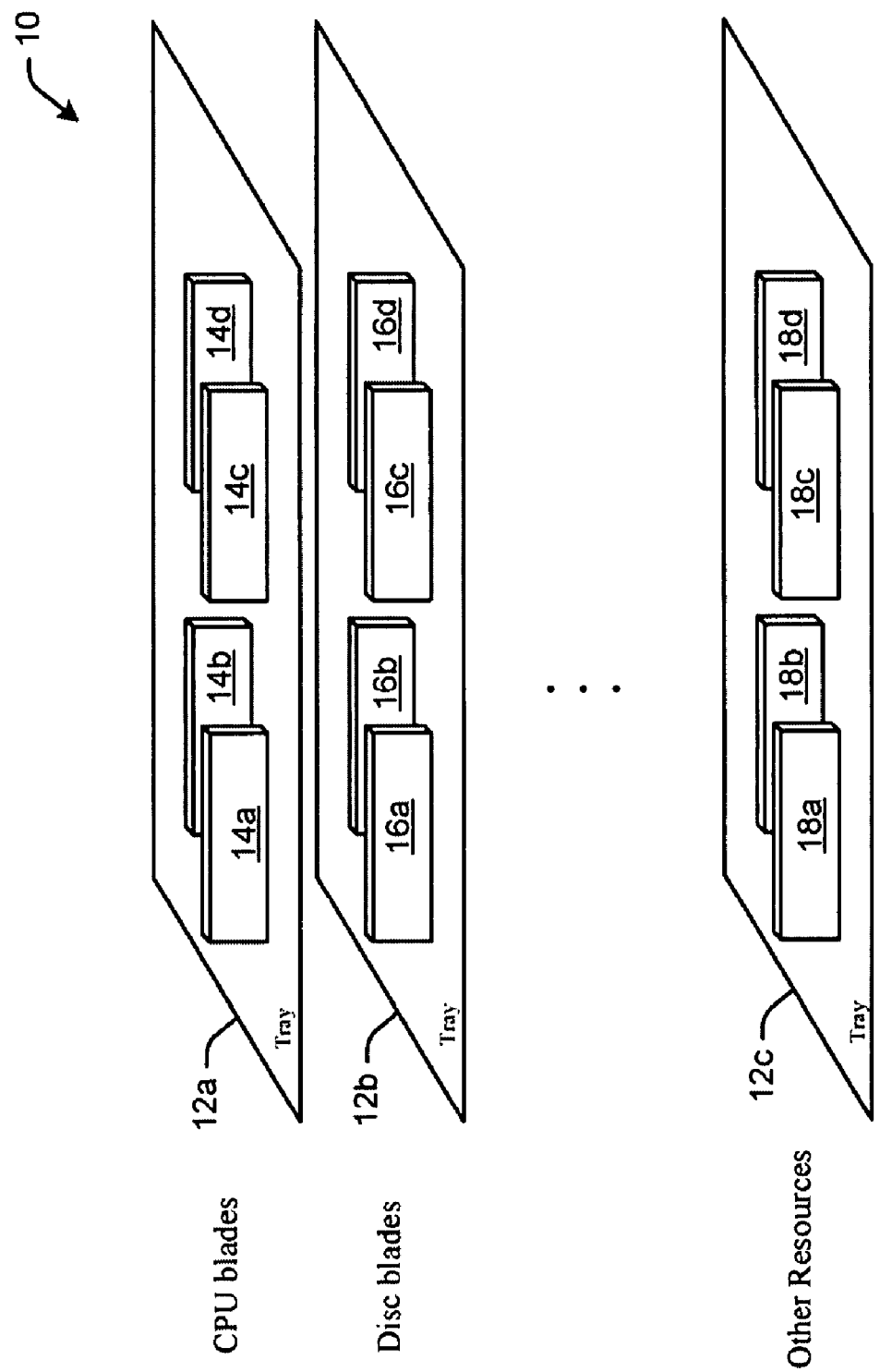
FIG. 1 is a high-level diagram illustrating an exemplary blade server architecture which may share legacy devices in a multi-host environment.

Briefly, exemplary embodiments described herein implement a hardware assisted virtualization of legacy devices (e.g., keyboard controller, video controller, mouse controller, read-only-memory (system ROM), BIOS/extensible firmware interface (EFI), etc.) for sharing among partitions in a multi-host environment. In addition, the hardware assisted virtualization of legacy devices do not need to scale on a one-to-one basis as more host partitions are added. That is, more host partitions may be added to the multi-host environment without having to add physical devices to support the added host partitions. Exemplary embodiments extend the rules of hardware partitioning such that legacy devices (including base level system services) can be shared via introducing software extensions into the hardware partitioning.

Before describing exemplary embodiments in more detail, it is useful to understand how certain terms are used herein to describe these embodiments. The terms "virtual machine" and "logical server" refer to a simulation, emulation or other similar functional representation of a computer system, whereby the virtual machine comprises one or more functional components that are not constrained by the physical boundaries that define one or more real or physical computer systems. The functional components comprise real or physical devices, interconnect busses and networks, as well as software programs executing on one or more CPUs. A virtual machine may, for example, comprise a sub-set of functional components that include some but not all functional components within a real or physical computer system; may comprise some functional components of multiple real or physical computer systems; may comprise all the functional components of one real or physical computer system, but only some components of another real or physical computer system; or may comprise all the functional components of multiple real or physical computer systems. Other combinations are also possible, and all such combinations are intended to be within the scope of the following disclosure.

The terms "virtual device" and "virtual legacy device" refer to a simulation, emulation or other similar functional representation of a real or physical computer device (e.g., a legacy device), whereby the virtual device comprises one or more functional components that are not constrained by the physical boundaries that define one or more real or physical computer devices. Like a virtual device may comprise any number of combinations of some or all of the functional components of one or more physical or real devices, and the functional components may comprise any number of combinations of hardware devices and software programs. Many combinations, variations and modifications will be apparent to those skilled in the art, and all are intended to be within the scope of the following disclosure.

The term "PCI-Express" or "PCIe" refers to the architecture and protocol described in the document entitled, "PCI Express Base Specification 1.1," promulgated by the Peripheral Component Interconnect Special Interest Group (PCI-SIG), and/or any earlier or later specifications related to the operation and implementation of PCIe or other PCI architecture and protocols.

Exemplary System

FIG. 1 is a high-level diagram illustrating an exemplary blade server architecture 10 which may share legacy devices in a multi-host environment. In an exemplary embodiment, the multi-host environment may be implemented as a virtual machine or a logical server. It is appreciated that commonplace elements of a blade server, such as power supplies, are not shown to simplify the drawing. Of course the blade server architecture 10 is shown only for purposes of illustration of one exemplary embodiment which may implement the systems and operations described herein.

In an exemplary embodiment, the blade server architecture 10 has a backplane (not shown) for providing power and networking connections to one or more trays 12a-c. Each tray 12a-c typically passes power and networking connections between each of the blades (e.g., CPU blades 14a-d, disc blades 16a-d, and other resource blades 18a-d).

One advantage of blade servers is the ability to densely pack various computing resources in a single package, and enable easy expansion, upgrades, and/or repairs. Conventionally, interconnect peripherals, such as PCI-connected devices, could not be directly accessed by the blades because by definition PCI-connected devices cannot be shared by more than one host. Instead, each of the blades had to be a complete computer system in itself, with one or more processor, memory, video, and storage capabilities. This architecture extends hardware partitioning for sharing soft devices into a virtual machine.

The embodiments described herein, however, enable virtual legacy devices to be directly accessed by the blades by making the virtual legacy devices "appear" to be directly connected to a host in the virtual machine accessing the device. Accordingly, the CPU blades 14a-d can be reduced to a CPU and memory, without having to include other functionality in the CPU blades 14a-d. For example, tray 12c may be used for cards connecting a keyboard, video card, mouse, ROM, and/or other virtual legacy devices similar to those already being used in conventional server environments. In addition, the virtual legacy devices may be allocated to any of the CPU blades and do not need to be added on a one-to-one ratio. This is particularly advantageous where the virtual machine functions in a server environment and resources such as a keyboard, video, or mouse are not needed on a continuous basis.

The virtual legacy devices (resource blades 18a-d) can be allocated to any of the CPU blades 14a-d in the virtual machine in any of a variety of different ways. For example, one or more of the virtual legacy devices can be shared between any of the CPU blades 14a-d, one or more of the virtual legacy devices may be used exclusively by any of the CPU blades 14a-d, or a combination thereof. The ability to use PCI interconnection offers significant flexibility and use of virtual legacy devices in the virtual machine or multi-host environment.

Before continuing, it is noted that multiple blade servers can be connected into a single interconnect network. Furthermore, although FIG. 1 shows tray 12a dedicated to CPU blades 14a-d, tray 12b dedicated to disc blades 16a-d, and tray 12c dedicated to other resource blades 18a-d, one skilled in the art will recognize that the number and arrangement of the trays 12a-c shown in FIG. 1 is provided for purposes of illustration only and is not intended to be limiting. For example, the blade server architecture 10 may have numerous trays, some of which may be populated with multiple types of devices.

Figure 2:
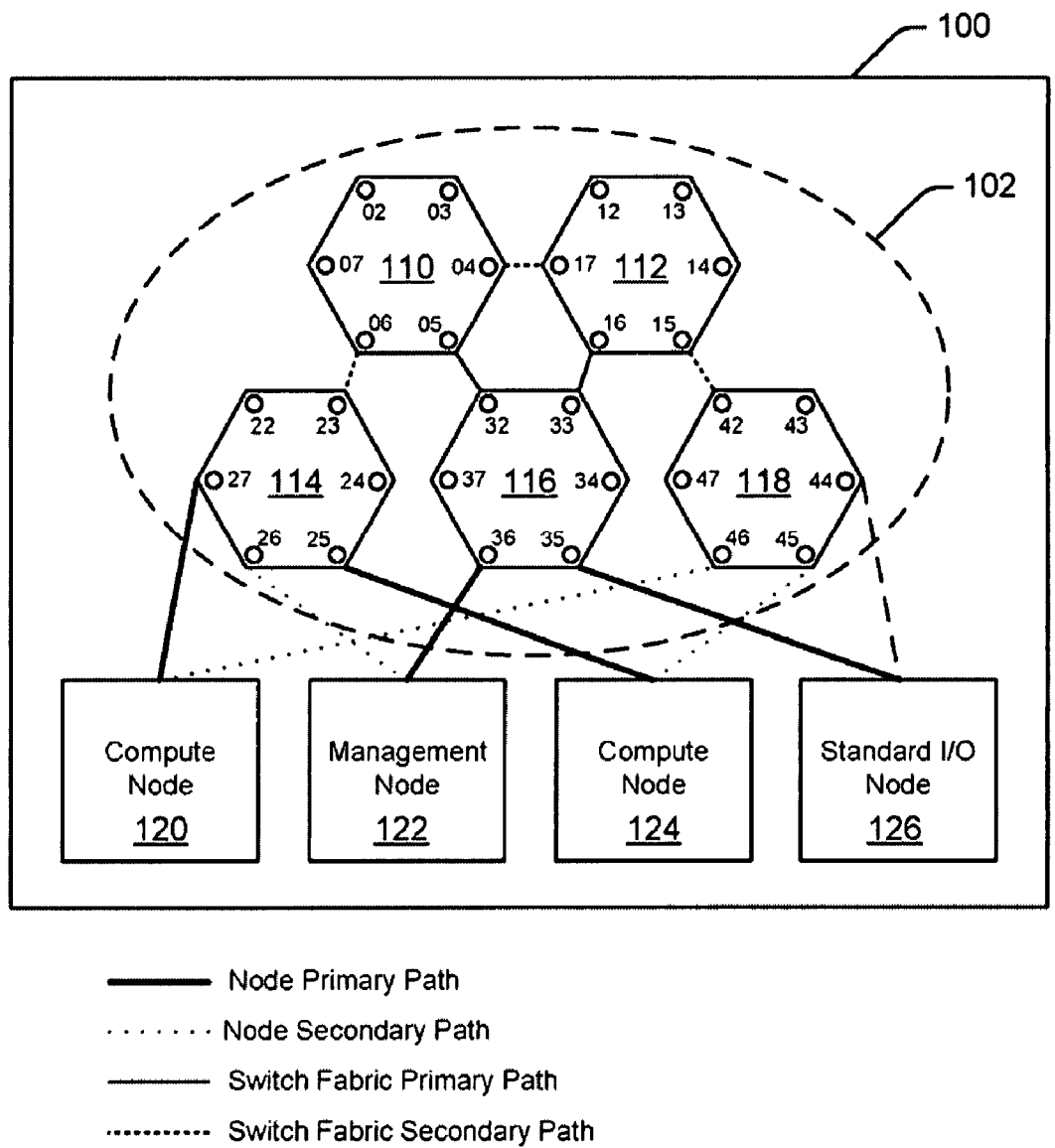
FIG. 2 is a functional illustration of an exemplary multi-host environment having a switch fabric for sharing legacy devices.

FIG. 2 is a functional illustration of an exemplary multi-host environment 100 having a switch fabric 102 for sharing legacy devices. The exemplary multi-host environment 100 may include several components or "nodes" that are interconnected by the switch fabric 102. The switch fabric 102 may provide redundant or alternate paths that interconnect the nodes and allow them to exchange data. In FIG. 2, the switch fabric 102 includes switches 110 through 118. The multi-host environment 100 also comprises compute nodes 120 and 124, management node 122, and standard input/output (I/O) node 126 (e.g., for non-legacy I/O devices).

Each of the nodes within the multi-host environment 100 couples to at least two of the switches within the switch fabric 102. For example, compute node 120 may couple to both port 27 of switch 114 and port 46 of switch 118; management node 122 couples to port 26 of switch 114 and port 36 of switch 116; compute node 124 couples to port 25 of switch 114 and port 45 of switch 118; and standard I/O node 126 couples to port 35 of switch 116 and port 44 of switch 118.

By providing both an active and alternate path, a node can send and receive data across the switch fabric 102 over either path. Thus, for example, if management node 122 needs to communicate with standard I/O node 126, but switch 116 has failed, the transaction can still be completed by using an alternate path through the remaining switches.

Because the underlying bus structure of the switch fabric 102 is not a rooted hierarchy and thus does not support alternate paths as described, extensions are provided to identify alternate paths by which each node and switch port is mapped upon initialization of the switch fabric 102. These extensions may be implemented within the switches so that hardware and software installed within the various nodes of the multi-host environment 100 can be used in conjunction with the switch fabric 102 with little or no modification to the switch fabric 102. For example, switch fabric 102 "pretends" to be a rooted hierarchy, wherein a switch 110 is "logically rooted" at any of its nodes, and as a result the management node 122 can be connected at any of the switch 110 ports to leverage the PCI infrastructure and programming model.

In an exemplary embodiment, the switch fabric 102 may be initialized for a peripheral component interconnect (PCI) architecture in one example as follows. Upon resetting the multi-host environment 100, each of the switches 110 through 118 designates each port as primary ports and the paths between the switches as active paths. The management node 122 then begins a series of one or more configuration cycles in which each switch port and endpoint is identified (referred to in the PCI architecture as "enumeration"), and in which the primary bus coupled to the management node is designated as the root complex on the primary bus. Each configuration cycle comprises accessing configuration data stored in the each device coupled to the switch fabric (e.g., the PCI configuration space of a PCI device).

The switches comprise data related to devices that are coupled to the switch. If the configuration data regarding other devices stored by the switch is not complete, the management node 122 initiates additional configuration cycles until all devices coupled to the switch have been identified and the configuration data within the switch is complete.

When switch 116 detects that the management node 122 has initiated a first valid configuration cycle, switch 116 identifies all ports not yet coupled as secondary ports. Subsequent valid configuration cycles may be propagated to each of the switches coupled to the secondary ports of switch 116, causing those switches to identify as secondary each of their ports not already coupled to the switch propagating the configuration cycle (here switch 116). Thus, switch 116 will end up with port 36 identified as a primary port, and switches 110, 112, 114, and 118 with ports 05, 16, 24, and 47 identified as primary ports, respectively.

As ports are identified during each valid configuration cycle of the initialization process, each port reports its configuration (primary or secondary) to the port of any other switch to which it is coupled. Once both ports of two switches so coupled to each other have initialized, each switch determines whether or not both ports have been identified as secondary. If at least one port has not been identified as a secondary port, the path between them is designated as an active path within the bus hierarchy. If both ports have been identified as secondary ports, the path between them is designated as a redundant or alternate path. Routing information regarding other ports or endpoints accessible through each switch (segment numbers within the PCI architecture) is then exchanged between the two ports at either end of the path coupling the ports, and each port is then identified as an endpoint within the bus hierarchy.

Once the initialization process has completed and the virtual machine begins operation, data packets may be routed as needed through paths identified during initialization. For example, the switch may receive a data packet, determine the destination of the data packet (e.g., by comparing routing information stored in the switch with the destination of the data packet), and based on the destination, the switch attempts to determine a route to the destination through the switch.

By adapting the switch fabric 102 as described above, the various nodes coupled can communicate with each other at rates comparable to the transfer rates of the internal busses within the nodes. By providing high performance end-to-end transfer rates across the switch fabric 102, different nodes interconnected to each other by the switch fabric 102, as well as the devices within the nodes, can be combined to form high-performance virtual machines. These virtual machines are created by implementing abstraction layers that combine to form virtual structures such as, e.g., a virtual legacy device on management node 122.

Figure 3:
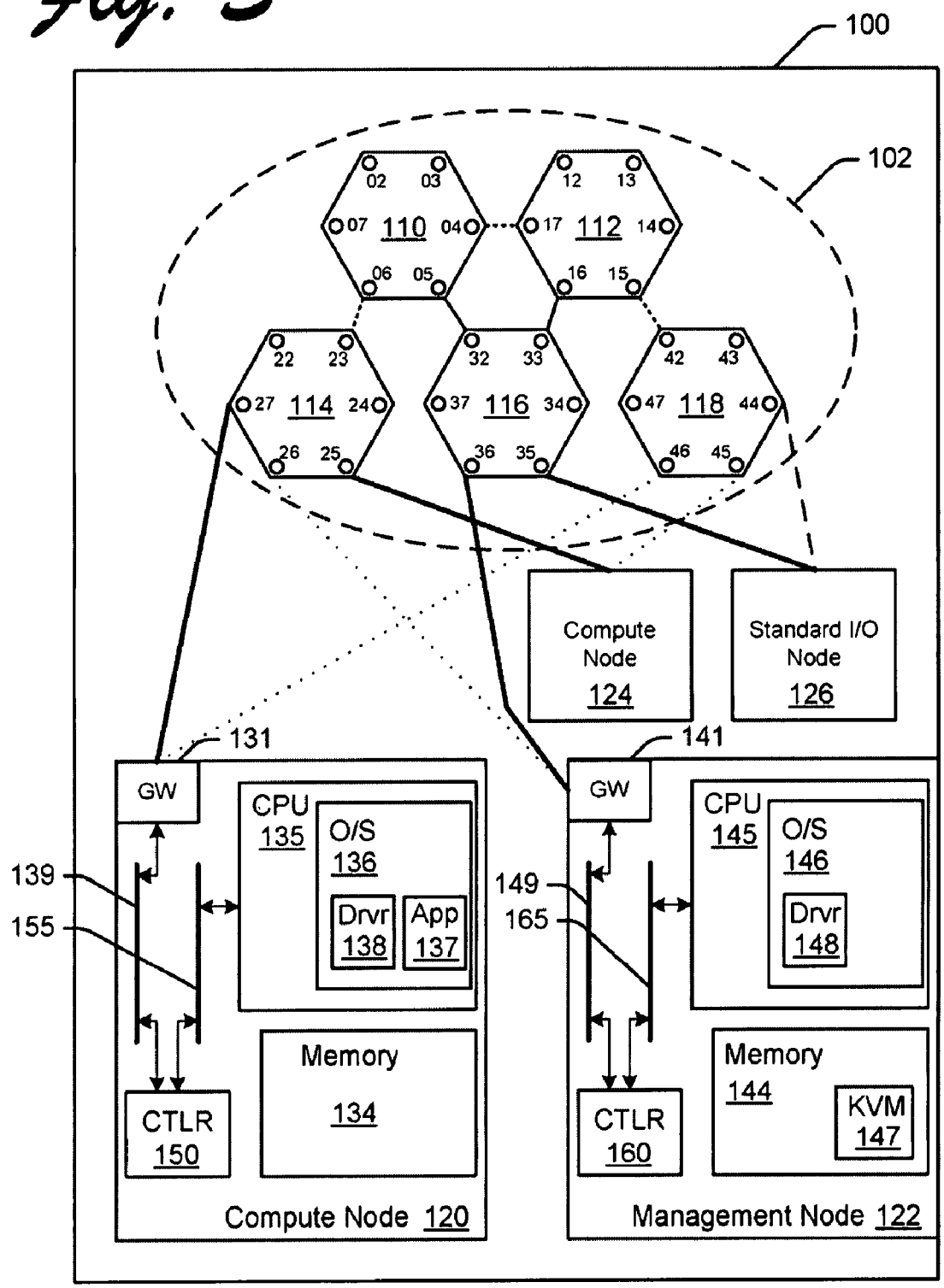
FIG. 3 is another functional illustration of the exemplary multi-host environment shown in FIG. 2 showing the compute node and the management node in more detail.

FIG. 3 is another functional illustration of the exemplary multi-host environment shown in FIG. 2 showing the compute node 120 and the management node 122 in more detail. In an exemplary embodiment, the compute node 120 comprises CPU 135 and bridge/memory controller 150, each coupled to front-side bus 155; gateway 131, which together with bridge/memory controller 150 is coupled to internal bus 139 (e.g., a PCI bus); and memory 134 which is coupled to bridge/memory controller 150. Operating system (O/S) 136, application program 137, and device driver 138 are program code that execute on CPU 135. Both application program 137 and device driver 138 execute within the environment created by operating system 136.

Management node 122 may similarly comprise a CPU 145 and bridge/memory controller 160, each coupled to front-side bus 165; gateway 141, which together with bridge/memory controller 160 is coupled to internal bus 149 (e.g., a PCI bus); and memory 144 which is coupled to bridge/memory controller 160. Operating system (O/S) 145 and device driver 148 are program code that execute on CPU 145. The device driver 148 executes within the environment created by operating system 146 to instantiate the virtual legacy device (indicated as keyboard, video, mouse (or logical/virtual KVM) 147 in memory 144.

Compute node gateway 131 and the management node gateway 141 each act as an interface to network switch fabric 102, and each provides an abstraction layer that allows components of each node to communicate with components of the other nodes without having to interact directly with the network switch fabric 102. Each gateway comprises a controller that implements an abstraction layer. It is the abstraction layer that device- or protocol-specific ordering rules are enforced. In addition the abstraction layer surfaces any control point for linking gateway nodes across the network switch fabric 102 to the management control point 122. Once bindings are established between gateways with like protocol/device solution the gateway connect in a transparent fashion when viewed from any compute node (e.g., nodes 120 & 124) into their respective PCI Express hierarchy. The gateways can optionally provide higher level services such as QoS, end-to-end flow control, for the network switch fabric 102.

The controller may comprise a hardware state machine, a CPU executing software, or both. The abstraction layer may be implemented as hardware and/or software operating within the gateway alone, or may be implemented as gateway hardware and/or software operating with driver software executing on a separate CPU. Other combinations of hardware and software may also be implemented, as will be readily apparent to those having ordinary skill in the art after becoming familiar with the teachings herein.

The abstraction layer thus implemented allows legacy devices on one node (e.g., management node 122) to be made visible to another node (e.g., compute node 120) as independent and discrete devices. The virtualization of a legacy device allows the node at the root level of the resulting virtual bus to enumerate the virtualized device within a virtual hierarchical bus. This is accomplished via bundling device instance associations between the fabric (102) gateways incorporated within compute node (120 & 124) and IO node (126). Once these instances are associated the compute node software stack (OS) 'sees' the virtual devices as discrete unshared resources that are managed, mapped and used as standalone unshared resources. As part of the abstraction layer, the virtualized device may be implemented by linking or associating instances between the compute node gateways (131) to (virtual legacy device instances within of the gateway 141 each instance with its associated descriptor blocks within management node memory-122 used to virtualized the legacy device using the software stack 148. The software driver executing within CPU 145 of management node 122 virtual legacy devices instance for each unique representation of a video, keyboard, ROM and mouse devices surfaced into a any compute node (120).

Once the association has been built by the management node 122, that is the binding of the legacy resource instance between the compute node gateways and the management node gateway with the appropriate descriptor block created and actively running with its associated software emulator driver (148), the compute node is allowed to power up. Once the compute node is powered up the software (OS 136) "sees" what it believes is a standard platform with full bare-metal control and access to physical resources including the legacy devices. With no hypervisor presenting on the compute node CPU (135) the sharing of legacy resources between host across a common interconnect is now possible. By using an abstraction layer, the individual devices (or their virtualized representations) do not need to be capable of directly communicating across network switch fabric 102 using the underlying protocol of the hierarchical bus of network switch fabric 102 (managed and enumerated by management node 122). Instead, each component formats outgoing transactions according to the protocol of the internal bus (139 or 149) and the corresponding gateway (131 or 141) for that node (120 or 122) encapsulates the outgoing transactions according to the protocol of the underlying network switch fabric 102. Incoming transactions are similarly unencapsulated by the corresponding gateway for the receiving node (120 or 122).

It is noted that the legacy device runs under the control of an OS running on a host-compute node. Typically, devices do not initiate communications with the host unless the host OS has configured the device to do so previously as a result everything starts with the host OS communication coming down into the device-virtual legacy device. Also it is important to note that the ROM device has no physical part as ROM is now memory space from within the management node 122 (inside memory space 147). The legacy devices are now software simulated devices in the management node 122 (e.g., as 147-148).

Briefly, when a legacy device needs to communicate with a compute node, data is read from the physical legacy device (e.g., a keyboard, video card, mouse, ROM, etc.). This data is split apart and put in an ordered location by the management node for the legacy device virtual instance for routing to the associated compute node (virtual machine). When the data is received at the compute node, the host driver at the compute node services the device (virtual device) interrupt in a standard fashion. When the compute node (host legacy device driver) is ready to send data to the virtual legacy device, the host driver for the virtual legacy device builds the packet request (either write or read request) that result in a PCIe transaction targeting the virtual legacy device. The compute node gateway on detecting the packet encapsulated the packet then routes the encapsulated packet using preconfigured management node settings that target the management node gateway. The management node gateway unencapsulates the packets then routes the packet into the management node memory space based on pre configured routing information that identifies a unique memory space for the virtual legacy device instance. Once the packet has been routed into the management node memory space the management node CPU is interrupted to service packet as a virtualized legacy device. This process is explained in more detail with reference to FIG. 4.

Figure 4:
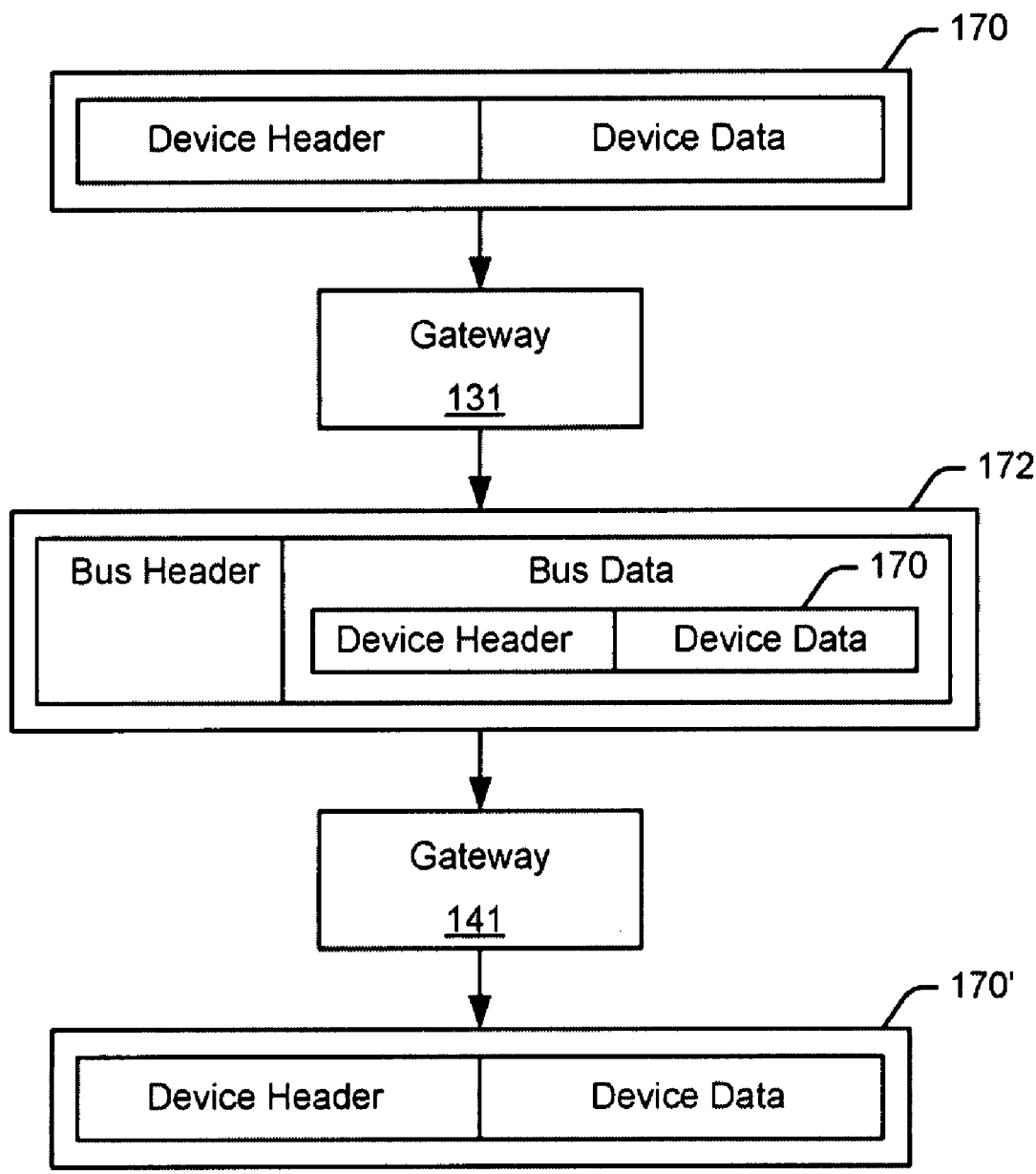
FIG. 4 shows device transactions encapsulated/unencapsulated within PCIe transactions for delivery in a multi-host environment.

FIG. 4 shows device transactions encapsulated/unencapsulated within PCIe transactions for delivery in a multi-host environment. If a legacy device is sending data to a compute node, the CPU presents the data to a device driver which then forwards the data to a gateway according to the protocol of an internal bus, for example, as device transaction 170. The device transaction 170 is encapsulated by gateway 131, which forms a transaction formatted according to the underlying bus protocol for the switch fabric, for example, as a PCIe transaction 172.

The network switch fabric routes the PCIe transaction 172 to another node, e.g., where the gateway 141 extracts the original unencapsulated transaction 170'. A virtualized representation of the real legacy device made visible by gateway driver processes, formats, and forwards the original unencapsulated transaction 170' to the CPU, allowing selected components of the nodes to interact as if communicating directly with each other over a single bus or traditional point-to-point interconnect. Of course, information may be similarly delivered from gateway 141 to gateway 131.

In exemplary embodiments, the abstraction layer also observes the packet or message ordering rules of the encapsulated protocol. Thus, for example, if a message is sent according to an encapsulated protocol that does not guarantee delivery or packet order, the non-guaranteed delivery and out-of-order packet rules of the encapsulated protocol will be implemented by both the transmitter and receiver of the packet/gateway, even if the underlying hierarchical bus of network switch fabric follows ordering rules that are more stringent (e.g., guaranteed delivery and ordering). Of course other quality of service (QoS) rules may also be implemented by the gateways. Such QoS rules may be implemented either as part of the protocol emulated, or as additional QoS rules implemented transparently by the gateways.

The encapsulation and abstraction provided by gateways are performed transparently to the rest of the components of each of the corresponding nodes. As a result, the virtualized representation of the legacy device (i.e., the virtual legacy device) behaves as if it were communicating directly with the receiving node across a single physical bus. Because the gateways encapsulate and unencapsulate transactions as they are sent and received, and because the underlying fabric has a level of performance comparable to that of internal busses, little delay is added to bus transactions as a result of the encapsulation and unencapsulation of internal native bus transactions. Also, because internal busses require no modification, legacy devices may be used within the system without the need for hardware modifications or special software drivers. The existence of the gateways and the functionality they provide is invisible to the rest of the hardware, as well as to operating systems executing on the CPUs of the nodes.

Each gateway allows virtualized representations of selected devices (i.e., the virtual legacy devices) within one node to appear as endpoints within the bus hierarchy of another node. Thus, for example, a virtual legacy device appears as an endpoint within the bus hierarchy of compute node, and is accordingly enumerated by compute node. The gateway itself appears as an endpoint within the switch fabric (managed and enumerated by the management node). There is no physical representation of the legacy devices even though this is a hardware partition.

Exemplary Operations

Figure 5:
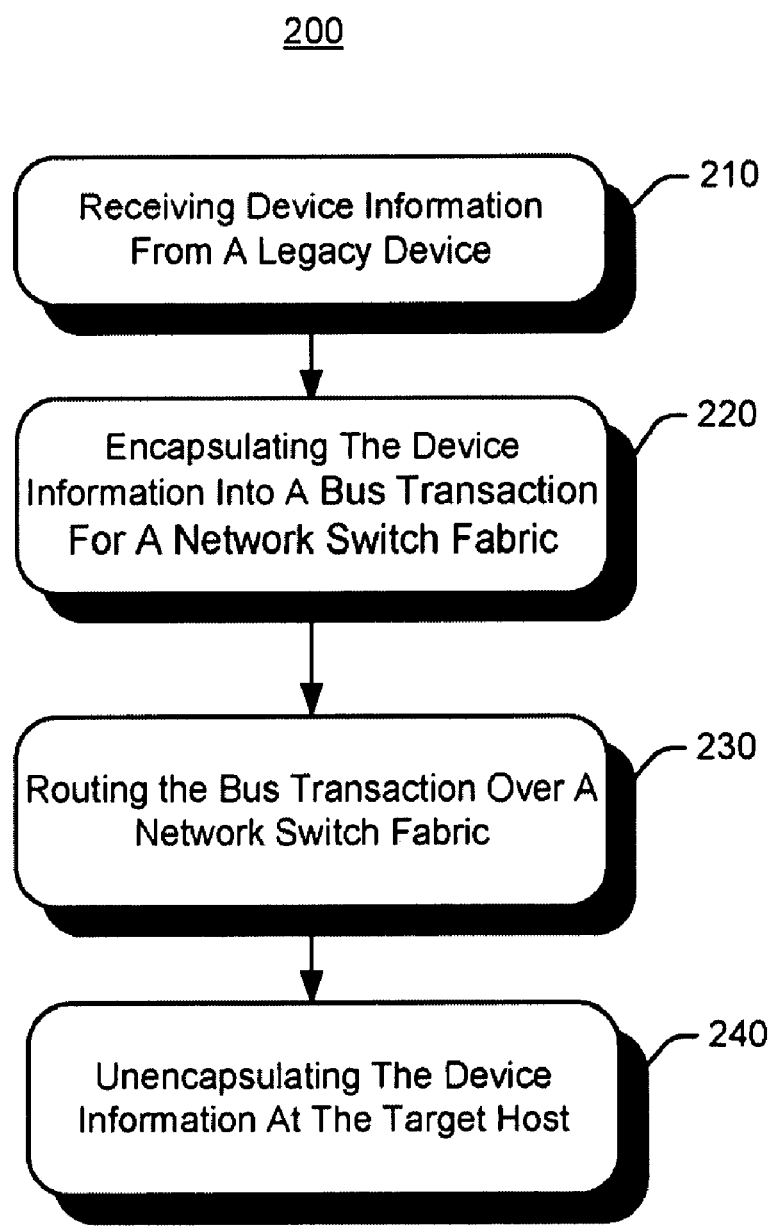
FIG. 5 is a flowchart illustrating exemplary operations which may be implemented for sharing legacy devices in a multi-host environment.

FIG. 5 is a flowchart illustrating exemplary operations which may be implemented for sharing legacy devices in a multi-host environment. Operations 200 may be embodied as logic instructions on one or more computer-readable medium. When executed on a processor, the logic instructions cause a general purpose computing device to be programmed as a special-purpose machine that implements the described operations. In an exemplary implementation, the components and connections depicted as part of a virtual machine in the figures may be used. It is noted that after setup the host OS on the compute nodes starts all communications with the legacy devices to initialize and setup, as described in more detail above.

In operation 210, device information may be received from a legacy device. The device information may identify a target host within a multi-host environment (e.g., the virtual machine). In operation 220, the device information may be encapsulated into a corresponding bus transaction for the network switch fabric. For example, the device information may be encapsulated into a PCIe transaction. In operation 230, the bus transaction is routed over a network switch fabric in the multi-host environment to the target host within the multi-host environment. In operation 240, the device information may be unencapsulated after being received at the target host.

It is apparent that these operations enable a legacy device that is not configured for sharing between hosts to be shared as a virtual legacy device between hosts in the multi-host environment (e.g., a virtual machine). Accordingly, host partitions may be added to the multi-host environment without having to add legacy devices on a one-to-one basis to support the additional host partitions. That is, there can be more host partitions than physical legacy devices in the multi-host environment, thereby enhancing scalability and cost savings.

The operations shown and described herein are provided to illustrate implementations of sharing virtual legacy devices in a multi-host environment such as a virtual machine or a logical server. It is noted that the operations are not limited to the ordering shown. Still other operations may also be implemented.

It is noted that the exemplary embodiments shown and described are provided for purposes of illustration and are not intended to be limiting. Still other embodiments are also contemplated for sharing legacy devices in a multi-host environment.

The invention claimed is:

1. A method for sharing legacy devices as virtual legacy devices in a multi-host environment, comprising:
    binding an instance of a legacy device between compute node gateways and a management node gateway with a descriptor block created and actively running with an associated software emulator driver;
    receiving device information from the legacy device, the device information identifying a target host within a virtual machine;
    encapsulating the device information into a corresponding bus transaction for a network switch fabric having a plurality of switches;

initializing the network switch fabric so that data packets are routed through redundant paths identified through the plurality of switches during initializing, wherein after a valid configuration cycle all ports not yet coupled are identified as secondary ports, wherein if at least one port has not been identified as a secondary port, a path is designated as an active path within the bus hierarchy, and if both ports have been identified as secondary ports, the path is designated as a redundant or alternate path; and routing the bus transaction over the network switch fabric in the virtual machine through paths identified during initializing to the target host within the virtual machine.

2. The method of claim 1, further comprising unencapsulating the device information after being received at the target host memory space.

3. The method of claim 1, further comprising virtualizing the legacy device in the virtual machine.

4. The method of claim 1, wherein the legacy device is a keyboard, video, or mouse device controller.

5. The method of claim 1, wherein the legacy device is system ROM mapped into the RAM space of a management node.

6. The method of claim 1, wherein the legacy device is an extensible firmware interface (ER).

7. The method of claim 1, wherein the legacy device is not configured for sharing among a plurality of hosts.

8. The method of claim 1, wherein the legacy device is represented completely in software.

9. The method of claim 1, further comprising adding host partitions to the multi-host environment without having to add legacy devices to support the additional host partitions.

10. The method of claim 1, further comprising propagating a subsequent valid configuration cycle to each of the plurality of switches coupled to secondary ports, and reporting port configuration as primary or secondary to ports of other switches to which a port is coupled.

11. A multi-host environment with shared legacy devices, comprising:

a management node communicatively coupled to a legacy device, the management node receiving device information from the legacy device;

a gateway in the management node configured to virtualize a legacy device header space into a virtual machine and encapsulate the virtual device information into a corresponding bus transaction;

a gateway in a compute note configured to virtualize the legacy device header for a host OS; and a network switch fabric for routing the bus transaction to a target host within the virtual machine, the network switch fabric initialized by each of a plurality of switches designating ports and paths between the plurality of switches as active and alternate, wherein if at least one of the ports has not been identified as an alternate port, a corresponding path is designated as an active path, and if more than one of the ports have been identified as alternate ports, the corresponding path is designated as a redundant path.

12. The multi-host environment of claim 11, wherein the device information identifies the target host within the virtual machine.

13. The multi-host environment of claim 11, further comprising a gateway at the target host for receiving the bus transaction.

14. The multi-host environment of claim 13, wherein the gateway at the target host unencapsulates and remaps the target address into a unique memory space pre-allocated for the legacy device information for processing at the target host.

15. The multi-host environment of claim 14, wherein information at the gateway travels in both directions from a virtual machine OS to the legacy device and from the legacy device to the virtual machine OS in response to a request from the virtual machine OS.

16. The multi-host environment of claim 13, wherein the target host comprises a CPU node.

17. The multi-host environment of claim 11, wherein the legacy device is virtualized in the virtual machine.

18. The multi-host environment of claim 11, wherein the legacy device is a keyboard, video, or mouse device.

19. The multi-host environment of claim 11, wherein the legacy device is ROM.

20. The multi-host environment of claim 11, wherein the legacy device is configured at least in part in the management node as a single-host device but operates as a virtual legacy device in the virtual machine.

21. The multi-host environment of claim 11, wherein host partitions can be added without having to add legacy devices on a one-to-one basis to support the additional host partitions.

22. The multi-host environment of claim 11, wherein the gateway in the compute note and the gateway in the management node each provides an abstraction layer for each node to communicate with components of other nodes without having to interact directly with the network switch fabric so that legacy devices on the management node are visible to the compute node as independent and discrete devices.

* * * * *

UNITED STATES PATENT AND TRADEMARK OFFICE
CERTIFICATE OF CORRECTION

PATENT NO. : 8,316,377 B2
APPLICATION NO. : 11/851306
DATED : November 20, 2012
INVENTOR(S) : Dwight D. Riley It is certified that error appears in the above-identified patent and that said Letters Patent is hereby corrected as shown below:

In column 9, line 26, in Claim 6, delete "(ER)." and insert -- (EFI). --, therefor.

In column 9, line 48, in Claim 11, delete "note" and insert -- node --, therefor.

In column 10, line 42, in Claim 22, delete "note" and insert -- node --, therefor.

Signed and Sealed this
Twelfth Day of March, 2013

Teresa Stanek Rea
*Acting Director of the United States Patent and Trademark Office*